UNITED STATES PATENT OFFICE.

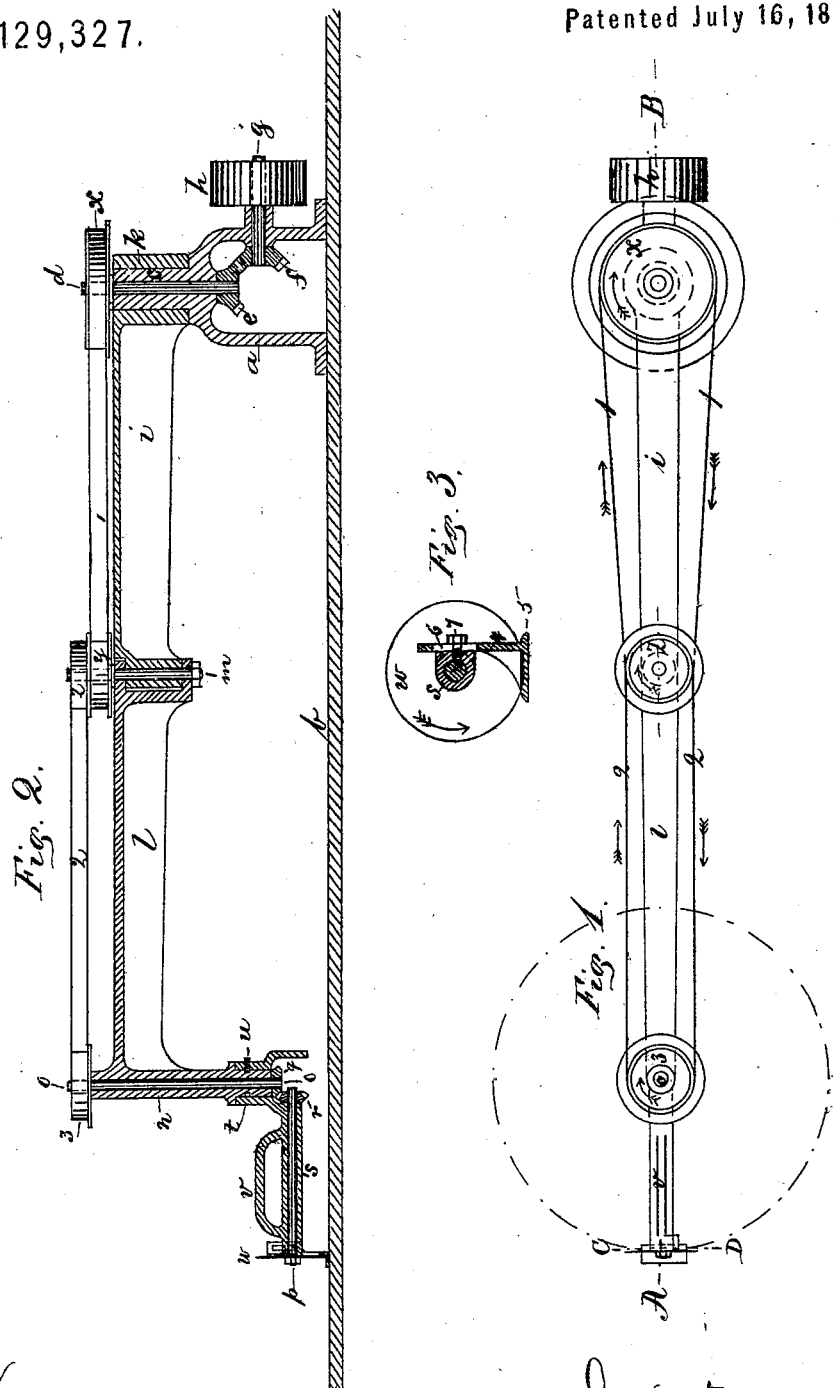

ISAAC FENNO AND PATRICK HOWE, OF BOSTON, MASSACHUSETTS.

IMPROVEMENT IN CLOTH-CUTTING MACHINES.

Specification forming part of Letters Patent No. 129,327, dated July 16, 1872.

We, ISAAC FENNO and PATRICK HOWE, both of Boston, in the county of Suffolk and State of Massachusetts, have jointly invented certain new and useful Improvements on Cloth-Cutting Machines, of which the following is a specification:

Nature and Objects of the Invention.

The nature of our invention relates to improvements on cutting-machines for cloth, &c., consisting in the employment of a rotary cutting-disk attached to a shaft that is made to revolve in a suitable sleeve hinged to a jointed arm. The cutting-disk is operated by means of gearings and belts or suitable devices, as will now be shown and described.

On the drawing, Figure 1 is a ground plan. Fig. 2 is a central longitudinal section over the line A B taken on Fig. 1; and Fig. 3 is an enlarged cross-section over the line C D also taken on Fig. 1.

Similar letters refer to similar parts wherever they occur on the drawing.

$a$ is a suitable standard, secured, by means of bolts or otherwise, to the operating-board $b$. The upper end of the standard $a$ is made as a circular hub, $c$, through which the shaft $d$ projects, and in which it has its bearing and revolves. To the lower end of the shaft $d$ is attached a bevel-gear, $e$, that gears into another bevel-gear, $f$, attached to the horizontal shaft $g$, as shown. The shaft $g$ runs in a bearing in the side of the standard $a$, and is provided on its outer end with a pulley, $h$, to which the motive power can be applied in the ordinary way. An arm, $i$, provided with a bored-out hub, $k$, is slipped over and made to swing easily around the circular hub $c$, as shown. The outer end of the arm $i$ is jointed to another arm, $l$, by means of the hinge-pin $m$ that projects through suitable ears made on the arms $i$ and $l$. The extreme outer end of the arm $l$ terminates as a sleeve, $n$, in which the vertical shaft $o$ revolves and has its bearing. The motion from the shaft $o$ is communicated to the cutter-shaft $p$ by means of a bevel-gear, $q$, attached to the shaft $o$, and another bevel-gear, $r$, attached to the cutter-shaft $p$. The cutter-shaft $p$ is supported and made to revolve in a bored-out sleeve, $s$, provided with a hub, $t$, that fits over the lower end of the sleeve $n$, around which it may swing in a complete circle, as indicated by dotted lines on Fig. 1. A small set-screw, $u$, is screwed through the hub $t$, and projects in a circular groove made on the sleeve $n$, by which arrangement the hub $t$ is connected to the sleeve $n$ at the same time as it is allowed to swing around it. A suitable handle, $v$, is attached to the sleeve $s$, by which the operator can guide the cutter in an easy manner. To the extreme end of the cutter-shaft $p$ is secured the revolving cutter $w$ in a suitable way. The motive power from the shaft $d$ to the shaft $o$ is conducted in the following manner: On the upper end of the shaft $d$ is secured a belt or cord pulley, $x$, as shown, from which an endless belt or cord, 1, is carried over the pulley $y$ that is made to run loose around the upper end of the hinge-pin $m$. On the top of the pulley $y$ is a similar one, $z$, made in one piece with the pulley $y$, over which an endless belt or cord, 2, is carried to the pulley 3 keyed onto the upper end of the shaft $o$, as shown.

By the arrangement of the pulleys $x$ $y$ $z$ 3 and the endless belts or cords 1 and 2 running over them, we are able to swing the arms $i$ $l$ in any desired direction, either around the shaft $d$ or half way around the hinge-pin $m$, without preventing the belts or cords 1 2 from working equally as well in all positions of the arms $i$ $l$, as the distances from the centers of the pulleys $x$ $y$ and $z$ 3 remain the same in all positions of the arms $i$ $l$.

To the extreme outer end of the sleeve $s$ is held an adjustable foot-piece, 4, provided with a foot, 5, by which arrangement the rotary cutter $w$ is prevented from cutting the table $b$ during the operation of the machine. The foot-piece 4 has a slot-hole, 6, in its upper end, through which the set-screw 7 is screwed into the sleeve $s$, as shown in Fig. 3, whereby the plate 5 may be raised and adjusted as the rotary cutter $w$ wears off by continued sharpening. A small incision may be made in the upper side of the foot 5 to serve as a guide for the cutting-wheel $w$.

The operation of our machine is as follows: The rotary cutter $w$ is set in rotary motion by means of power applied to driving-wheel $h$, which is communicated to the rotary cutter $w$ by means of the bevel-gears $e$ $f$, drum $x$, belt 1, pulleys $y$ $z$, belt 2, pulley 3, shaft $o$, bevel-gears $q$ $r$, and the shaft $p$, or their equivalents, and the operator guides the rotary cutting-disk $w$, by means of the handle $v$, over the cloth or other fabric that is to be cut to a pattern first marked upon the upper side of such fabric. The cloth or other fabric passes between the upper side of the foot 5 and the lower edge of the rotary cutting-wheel $w$, where it is cut clean and smooth in a quick and easy manner.

By the construction of the jointed arms $i\ l$ and jointed sleeve $s$ we are able to cut any desired curves or angles on the cloth or other fabric; and whereas formerly an operator could only cut four or six thicknesses of cloth at one time with the ordinary pair of shears now in use, we are able, with this our cutting-machine, to cut even as many as twenty thicknesses of the same material at one operation, thus saving a great deal of labor and time in the manufacture of ready-made clothing or other materials for which our machine may be useful.

Having thus fully described the nature, construction, and operation of our cutting-machine, we wish to secure by Letters Patent, and claim—

1. A rotary cutter $w$, arranged and operated upon the end of a series of swinging arms, substantially as shown and described.

2. The construction and arrangement of the jointed sleeve $s$, made to swing around the sleeve $n$, and the jointed arms $l\ i$, one or more, for the purpose and in a manner as herein shown and described.

3. The driving mechanism, as herein shown, consisting of the bevel-gears $e\ f$ or their equivalents, shaft $d$ with its pulley $x$ attached, loose pulleys $y\ z$, belts or cords 1 2, the pulley 3 attached to the shaft $o$, bevel-gears $q\ r$ or their equivalents, and the cutting-shaft $p$, for the purpose described.

4. In combination with the rotary cutting-disk $w$, the adjustable foot-plate 4 5, adjusted by means of the set-screw 7 and slot-hole 6, or their equivalents, in a manner set forth and described.

5. In combination with the jointed arms $i\ l$ and sleeve $s$, the stationary standard $a$ provided with the circular hub $c$, around which the movable arms $i$, $l$, and $s$ are made to swing, for the purpose and in a manner as herein shown.

ISAAC FENNO.
PATRICK HOWE.

Witnesses:
 ALBAN ANDRÉN,
 BERNARD GALLAGHER.